W. J. BROWN.
DEVICE FOR BORING CONNECTING RODS.
APPLICATION FILED JUNE 2, 1920.
1,414,337.
Patented May 2, 1922.
4 SHEETS—SHEET 1.
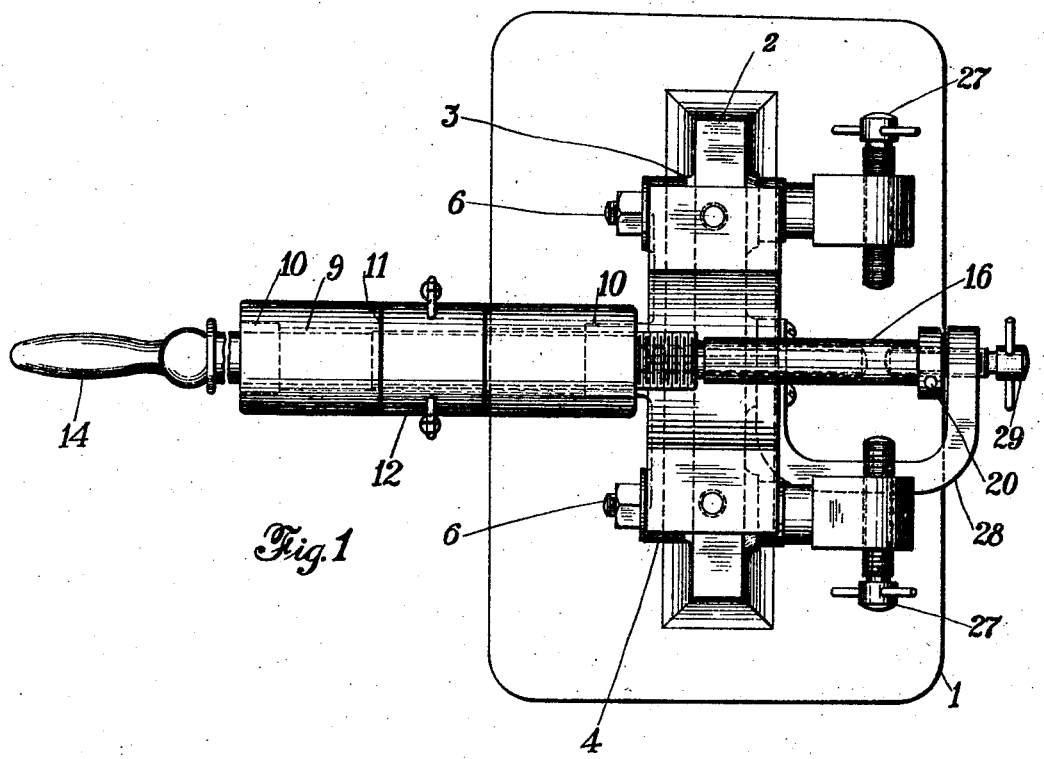
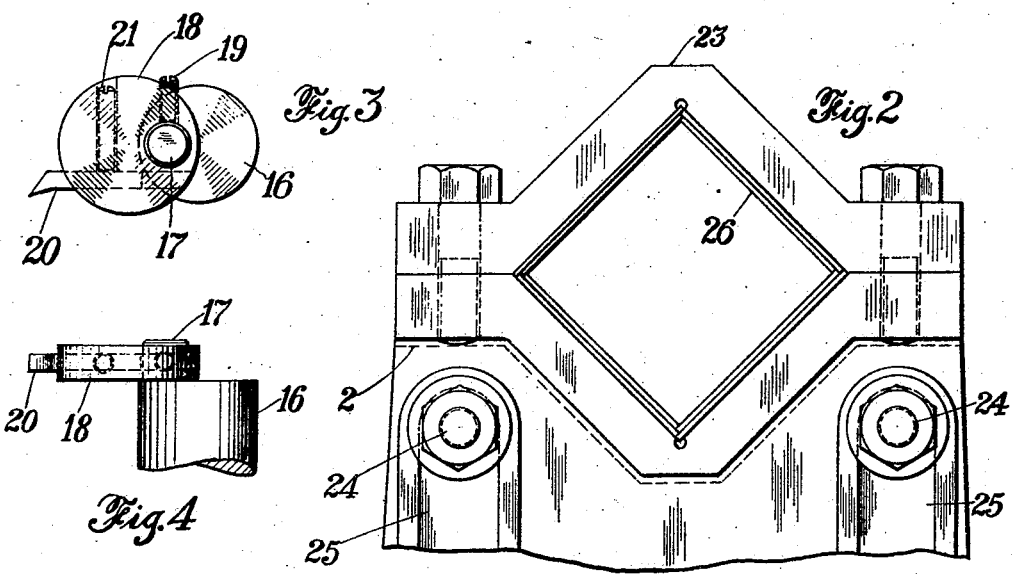
Inventor
William J. Brown
By his Attorney
Paul M. Klein

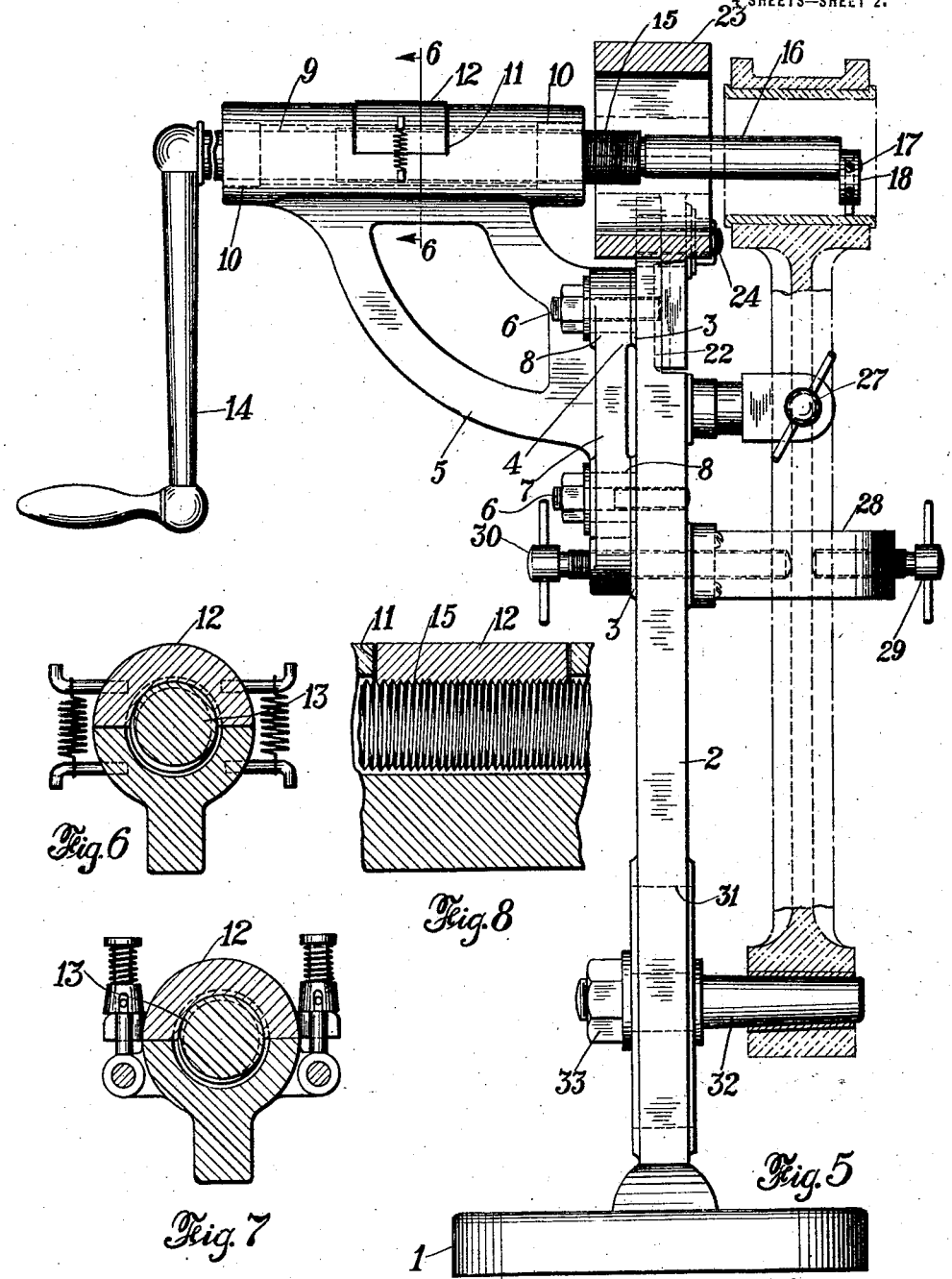

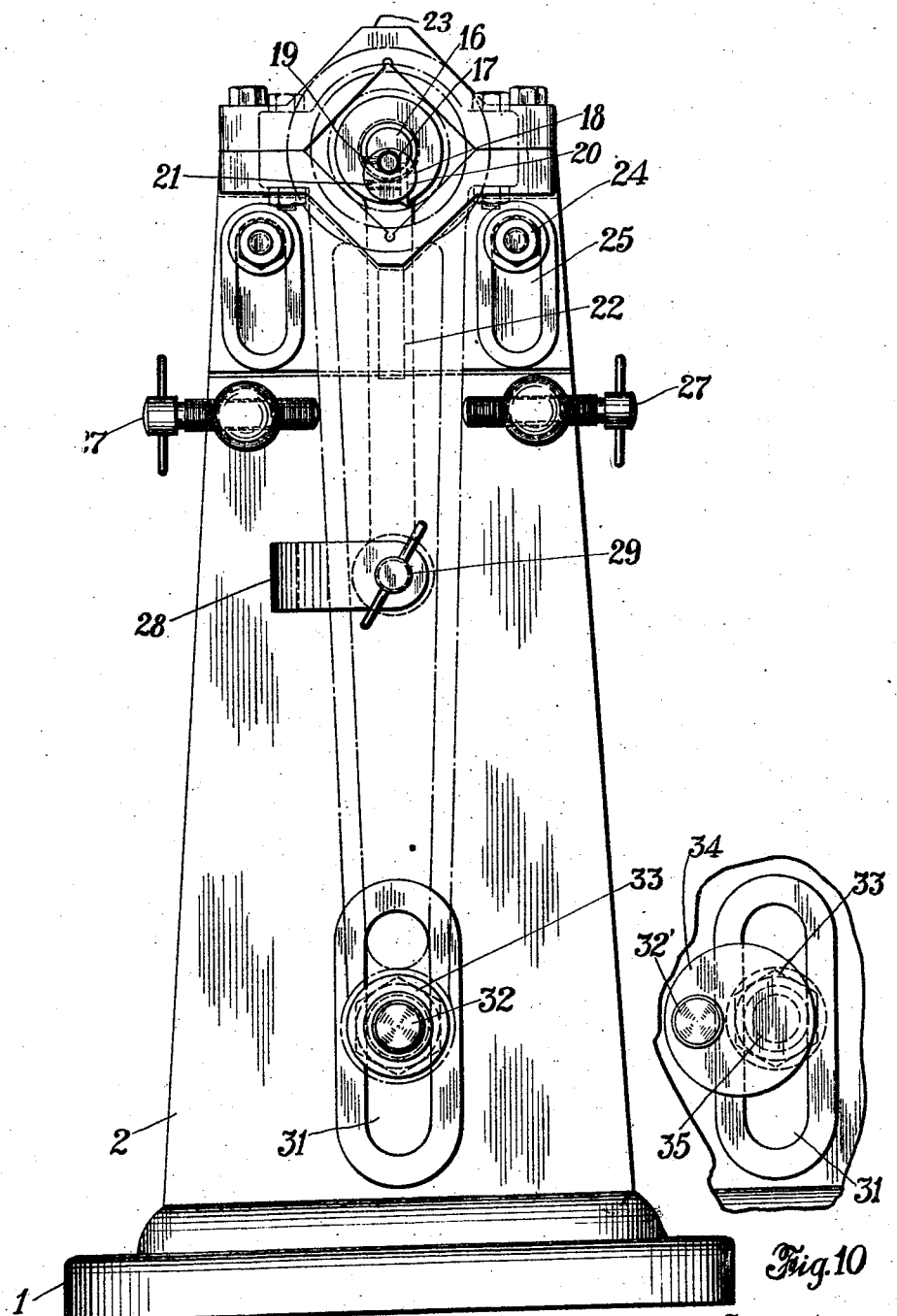

UNITED STATES PATENT OFFICE.

WILLIAM J. BROWN, OF NEW YORK, N. Y.

DEVICE FOR BORING CONNECTING RODS.

1,414,337.  Specification of Letters Patent.  Patented May 2, 1922.

Application filed June 2, 1920. Serial No. 386,003.

*To all whom it may concern:*

Be it known that I, WILLIAM J. BROWN, a citizen of the United States, and resident of New York, in the county of Kings and State of New York, have invented certain new and useful Improvements in Devices for Boring Connecting Rods, of which the following is a specification.

This invention relates to boring and reaming devices in general, and particularly to the kind adapted for boring bearings and bushings of connecting rods for internal combustion engines.

Its object is to provide a comparatively simple and inexpensive machine operable by hand and so arranged as to permit any kind of adjustment necessary for centering and laterally and transversely adjusting and firmly holding a connecting rod, the bearings of which are to be machined.

Another object of my invention is to provide means in connection with my device for machining not only bearings set within a connecting rod, but also individual, separate bushings or bearings which may be later set in a connecting rod or put to any other use.

A very important object of my invention is to provide an adjustable tool holder which may be set to cut bearings of various diameters.

Another equally important object of my invention is to provide means whereby the tool may be rendered automatically inoperative when meeting sudden undue resistance during the cutting operation.

My device is designed for boring, reaming and aligning bearings or bushings of connecting piston rods or pitmen or other machinery and is particularly adapted for machining individual, separate bushings or bearings, preparatory to their being used in combination with machine parts.

The aforementioned and further objects of my invention, will be more fully apparent from the following description and the accompanying drawings, forming part of this specification, in which:—

Figure 1 is a top view of my device.

Figure 2 is a detail of the bushing holder.

Figures 3 and 4 are detail views of the tool holder.

Figure 5 is a side elevation of my device.

Figures 6, 7 and 8 are detail views of preferred forms of the spindle feeding or engaging device.

Figure 9 is the front elevation of my device.

Figure 10 is a detail view of a modified form of a length adjustment device.

Figure 11:
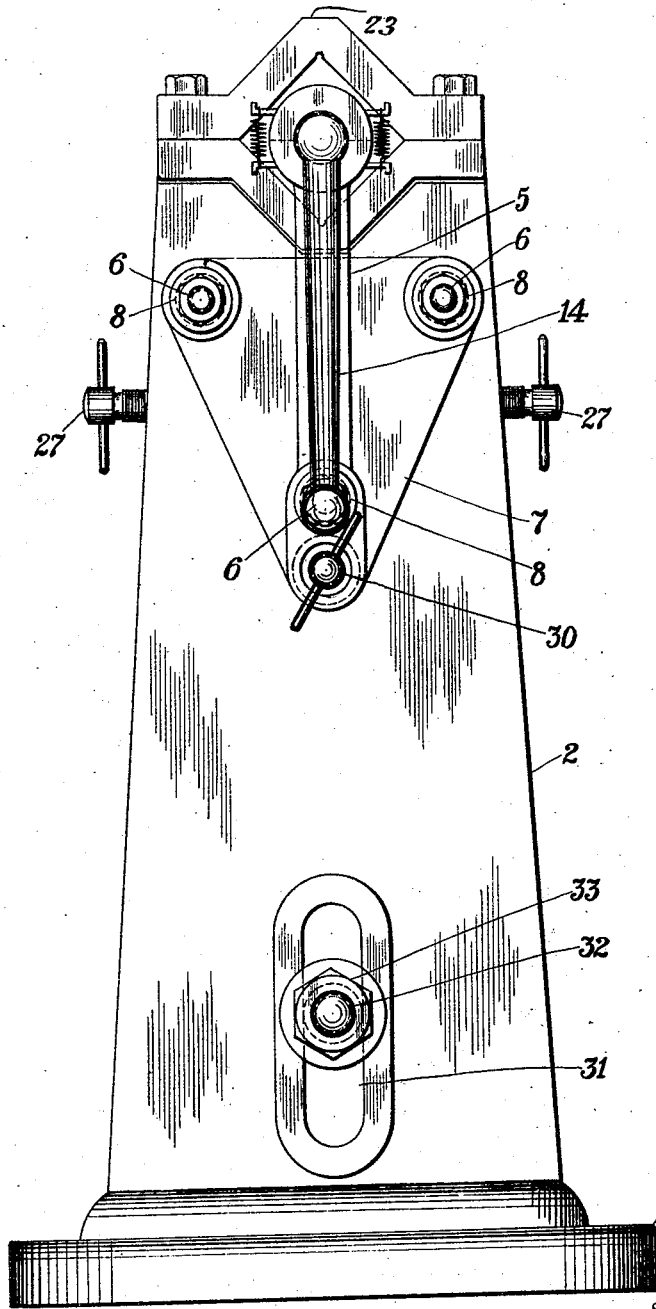
Figure 11 is the rear elevation of my device.

In practice it very often becomes necessary to re-fit connecting rods with new bearings. It is not unusual that piston rods especially for internal combustion engines after having been in operation for a length of time while their bearings were worked out, suffer considerable deformation.

When such deformation has taken place it is very difficult to correct it without materially influencing the future working of the engine. The replacing of bushings or bearings in a deformed connecting rod in such case is preferably made without bringing the rod to its original straight shape.

My device is adapted to facilitate the replacement of bearings of not only straight, but also of deformed connecting rods.

In the drawings a base plate 1 is shown having an upright standard 2 forming the main support for the combined features comprising my device. The upper part of the standard is provided with faced raised portions 3 against which are clamped the faced parts 4 of bracket 5 by way of studs 6 arranged in a triangle. The bracket base 7 is equipped with apertures 8 facilitating the adjustment of the bracket.

Its upper portion forms a spindle sleeve 9 having end bearings 10 and a cut-out 11 for receiving a semi-cylindrical internally threaded member 12 held in position and under tension by spring devices.

Rotably lodged in the end bearings 10 of the sleeve 9 is a hand operated boring spindle 13, having a hand crank 14, by means of which it may be turned. The spindle portion passing through the sleeve is finely threaded as shown at 15, the thread corresponding to that of member 12 which engages it. The working end of the spindle is reduced at 16 and possesses at its end an eccentrically disposed pin 17 (Figures 3 and 4) adapted to receive a tool holder 18 provided with an aperture also out of center for receiving pin 17. A set screw 19 facilitates the positioning of the tool holder relative to the spindle. The tool holder 18 is equipped for adjustably receiving either a reaming or boring tool indicated at 20, held in place by set screw 21.

Through the eccentric arrangement of pin 17 and the tool holder together with the adjustable tool, any size of bearings or bushings may be machined.

Slidably guided in a dove tail indicated at 22 at the top of the standard 2 is a square shaped bearing or bushing holder or vise 23 adjustable to any desired height by means of bolts 24 in slots 25.

Adjusting plates 26 (Figure 2) facilitate clamping in the vise bushings of various sizes. Below the vise and set into the standard 2 a pair of adjustable bolts 27 is provided for clamping a piston rod, indicated in dashed and dotted lines, from the sides.

Directly beneath and at the center of the standard a U-shaped yoke 28 is attached and is provided with two other set screws 29 and 30, the latter passing through the standard.

The second set of clamping screws serve for pressing against the web of the connecting rod.

At the lower part and at the center of the standard a slot 31 is provided for receiving a conical pin 32 held in place by nut 33 at any desired height. By way of this pin the bushing of the connecting rod which is not being bored is held in perfectly centered position.

In order to allow for better adjustments and particularly in cases where the connecting rod is deformed an eccentric 34 (Figure 10) is provided at the end of a through going cylindrical pin 35 and a conical pin 32' takes the place of pin 32.

By moving pin 32 of Figure 9 and pin 35 of Figure 10 in slot 31 length adjustments may be made to suit the length dimension of any connecting rod.

The conical bearing receiving pins assure the correct centering of the rod end not engaged by tool 20.

When a connecting rod is properly placed and clamped in position and the tool head 18 adjusted to cut or ream to desired dimension spindle 13 is turned by crank 14.

The threaded semi-cylindrical shell 12 engages the threads 15 of spindle 13 whereby it is fed or propelled forwards. When the tool 20 encounters sudden resistance, due for instance to improper setting up of the device or the connecting rod, the member or shell 12, being yieldingly held under spring tension, automatically disengages the spindle as the spindle thread lifts it out of alignment.

Thus the spindle is permitted to revolve in end bearings 10 of sleeve 9 while not moving forward.

This feature becomes of great importance in use when unskilled labor is employed for operating my device. It also serves as safeguard in the event of unforeseen changes in the properties of the bearing material.

The bushing or bearing holder or vise with its adjusting plates for making fine adjustments is another important feature for facilitating the preparation and finishing of bearings prior to being put into the connecting rod.

With the conical pins 32 or 32' the device assures perfect parallel alignment of the wrist pin bushing and the head of a connecting rod.

Having thus described my invention and reserving for myself the right to make changes and improvements within the broad scope of my idea, I claim :—

1. In a bearing boring device for connecting rods having a threaded tool spindle, tool spindle feeding means engaging the spindle threads, spring means for keeping said feeding means in engagement with the spindle and facilitating said feeding means to be lifted by the threads of and to disengage the spindle when the latter meets resistance.

2. In a bearing boring device for connecting rods having a hand operated tool spindle provided with a threaded portion, a threaded element adapted to normally engage the threaded spindle portion, thus making the latter operative means for keeping said element in normal engagement with the spindle and adapted to permit said element disengaging the spindle when the latter meets with undue resistance, thus making it inoperative.

3. In a connecting rod boring and reaming device, a horizontally disposed partially threaded spindle, a spindle sleeve having smooth end bearings for guiding said spindle, means provided in said sleeve for engaging the threaded spindle portion and for making the spindle operative, said means adapted to be automatically lifted by the threaded spindle portion, thus making the spindle inoperative when said tool meets with sudden resistance.

4. An apparatus of the character described, comprising in combination, a base, a standard extending perpendicularly thereto provided with vertical guiding means at its upper end, an adjustable bushing or bearing support engaging said guiding means, an adjustable spindle support attached at one side of said standard, means provided in said standard for facilitating the adjustment of said spindle support, a spindle lodged in said support, provided at one end with an operating crank, the opposite end adapted for receiving a tool holder, a fine thread provided at the spindle portion lodged in said support, a threaded removable semi-cylindrical element engaging the threaded spindle portion under spring tension, means for laterally adjusting a piston rod provided at the lower part of said standard, means for transversally adjusting a piston rod, and means for clamping the adjusted piston rod in proper position.

Signed at New York in the county of New York and State of New York this 3rd day of May A. D. 1920.

WILLIAM J. BROWN.